March 28, 1933.  A. L. LUSSIER  1,903,121
DUAL WHEEL STRUCTURE
Filed June 25, 1932
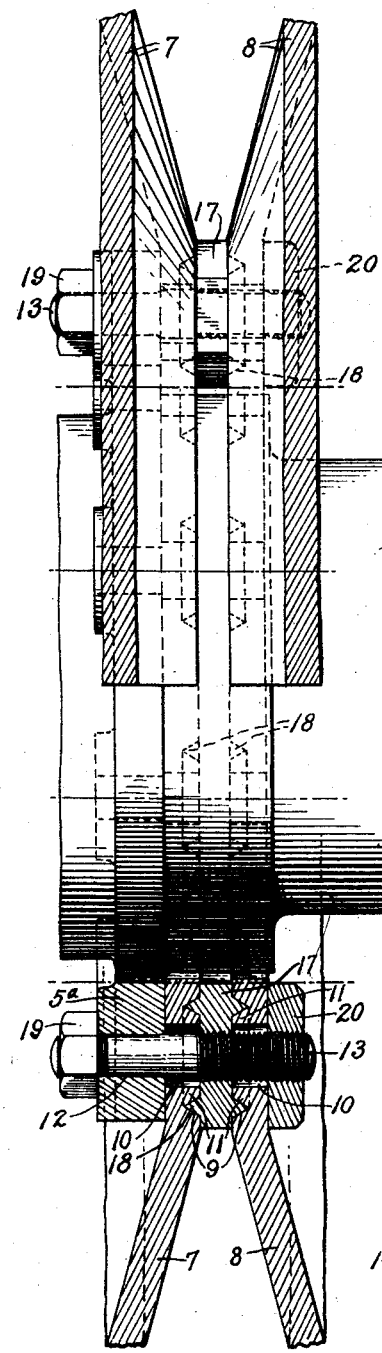
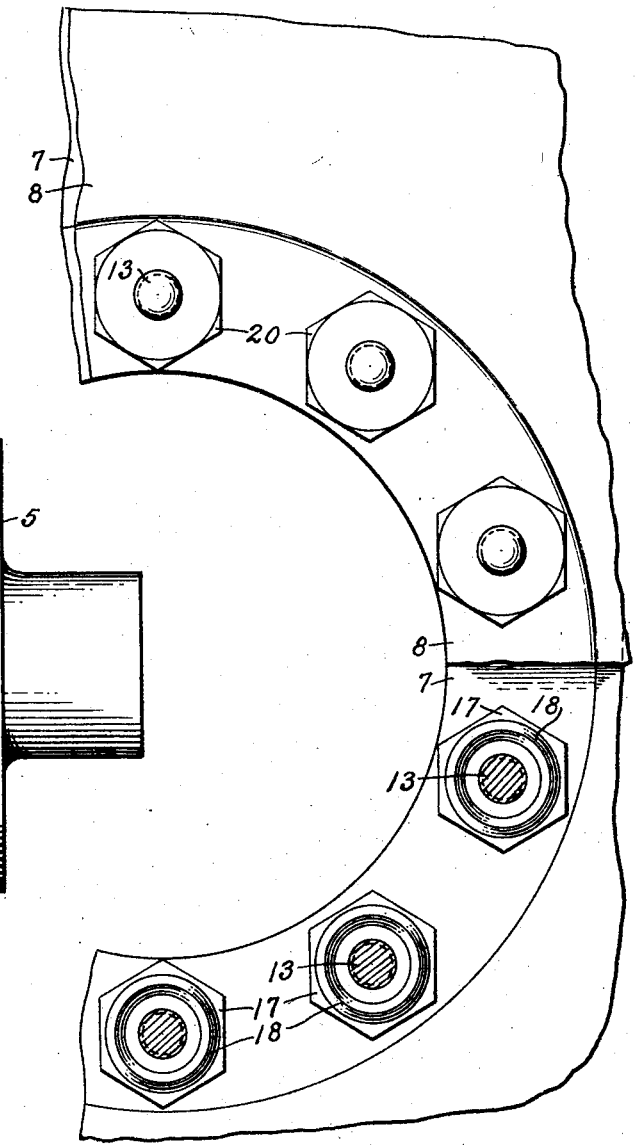
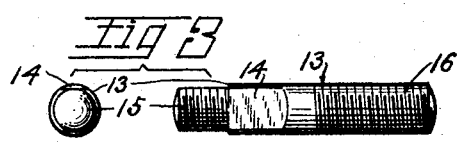
Inventor
A. L. LUSSIER.
By
Sterling P. Buck,
Attorney.

Patented Mar. 28, 1933

1,903,121

UNITED STATES PATENT OFFICE

ALPHONSE LARRAINE LUSSIER, OF SPRINGFIELD, MASSACHUSETTS

DUAL WHEEL STRUCTURE

Application filed June 25, 1932. Serial No. 619,338.

This invention relates to wheels for vehicles, and especially to an improved dual wheel structure.

One object of this invention is to provide a very strong, durable and effective means for securing the webs or discs of two wheels together in axial alinement so as to form an especially well balanced dual wheel such as those which are used on trucks, busses and other heavy motor vehicles.

Another object is to provide a wheel structure of this character which can be very quickly and accurately assembled, and which can be quickly and easily disassembled for making any necessary repairs which may result from a collision or other accident.

A further object of the invention is to provide a wheel structure of this character with threaded securing bolts and with corresponding bolt-holes, the latter being of considerably greater diameter than the bolts, and each of said bolts being provided with a combined securing and spacing member which also serves to guide and hold the wheel discs in accurate axial relation with the hub and with one another.

Other objects and important features are pointed out or implied in the following details of description in connection with the accompanying drawing in which:

Figure 1 is a sectional view, the section at the lower part being in axial plane, whereas the section at the upper part is taken along a plane tangential to the hub, a number of the securing bolts being omitted but their axial centers being indicated by broken lines.

Figure 2 is a fragmentary view showing a segment of the wheel structure, including substantially a quarter-section of each of the wheel-discs, the upper part of the inboard wheel-disc being hidden behind the corresponding part of the outboard wheel-disc.

Figure 3 is a bracketed view illustrating an end view and a side view of one of the ten securing bolts.

Referring to the drawing in detail in which similar reference characters correspond to similar parts in the several views, and in which the hub 5 is of the usual or well known construction having an apertured securing flange 5a, the invention is now described in detail as follows:

The main parts of the inboard wheel-disc 7 and the outboard wheel-disc 8, fragments of which are here shown, may be of appropriate shape, according to the size and kind of rims with which they shall be provided for holding the felloes and tires; but the inner or hub attaching parts of these discs are provided with annular grooves 9 which are wedge shaped or V-shaped in cross section, each of these groves 9 being concentric with a bolt-hole 10, so that a securing annulus 11 is provided for each of the ten securing parts of each wheel disc.

The hub-flange 5a is provided with an annular series of non-circular holes 12, ten of such holes in this embodiment of the invention, and each hole 12 is fitted with a non-cylindrical shank of a securing bolt 13. The shank 14 of each securing bolt is preferably the same diameter as the main part of the bolt, but is slabbed as indicated at 14 in Figure 3. The inner end of each bolt 13 is reduced in diameter and threaded at 15, whereas the outer end portion 16 is threaded substantially to the middle part of the bolt. A combined securing and spacing member or unit 17 is provided for each bolt 13 being centrally apertured and internally threaded so as to fit on the middle part of the corresponding bolt 13. Each of these members 17 is provided with two annular ridges which are wedge shaped or V shaped in cross section, these annular ridges extending from opposite faces of the member 17 and being adapted to fit within the grooves 9 of the inboard and outboard discs. The periphery of each member 17 is non-circular, preferably hexagonal, so that any appropriate nut-wrench may be used for screwing these members onto the respective securing bolts after the latter have been secured in the bolt-holes 12 by nuts 19, and after the inboard disc 7 has been placed against the hub flange 5a.

In this connection, it should be noted that the bolt-holes 10 are of considerably greater diameter than the bolts 13 so that the discs can be placed around the hub without any interference of the bolts, as when the bolt-holes are the same diameter as the bolts. In the latter case, the threads of the bolts are likely to be battered or bent, so as to interfere with screwing the parts 17 and the securing nuts 20 thereon. For the sake of convenience or efficiency the periphery of the nuts 20 is preferably of the same size and shape as those of the parts 17, so that the same socket wrench can be used for the nuts 20 as for the parts 17.

Referring again to the annular grooves 9 and to the corresponding ridges 18, it should be understood that they are accurately concentric with the axes of the respective bolts 13. Therefore, it is not essential that the series of bolt-holes 10 be accurately concentric with the hub 5, inasmuch as the bolt-holes are large enough to compensate for any slight inaccuracy of the positions of the bolt-holes. However, because of the accuracy of the positions of the annular grooves and corresponding annular ridges, the wheel discs are held accurately concentric with the hub and with one another. Moreover, a feature of still greater importance is now explained as follows:

Each annular ridge presents a considerably greater area of bearing surface than would be presented by bolt-holes fitted closely around the bolts, especially where the discs are of relatively thin material. Both the inner and outer surfaces of each annular ridge 18 are effective for securing the respective discs in place; for assuming that the lower part of the inboard disc is held against downward movement, while there is a heavy downward pressure on the hub 5, it will be seen that the lower part of the outer side of the ridge presses against the lower side of the outer wall of the corresponding groove, while the inner side of the same ridge presses against the annulus 11, that is against the inner wall of the groove 9, at the upper part thereof. The same, as just previously described, is true with respect to the outboard disc 8 and the corresponding annular ridge 18, and the same is true with respect to each one of the annular ridges of each of the combined securing and spacing members 17. In practice, the annular ridges may be made slightly higher than the depth of the corresponding grooves, so that when each member 17 is screwed into place by heavy pressure, the ridge will force its way into the groove, spreading the latter slightly but sufficiently to bring the contiguous plane surface of the member 17 against the corresponding plane surface of the inboard disc. Likewise, when each nut 20 is tightened under heavy pressure, it causes the annular groove of the outboard disc to spread slightly in consequence of the contiguous annular ridge being wedged and forced into this groove.

In addition to the advantages pointed out in the foregoing, it will be seen that a considerable air space is provided between the members 17 and between the wheel-discs, as well as an air space between the hub and each wheel. These air spaces permit air to circulate between the discs 7 and 8 and around the hub 5, thus providing an automatic means for reducing the temperature of the inner and outer parts of the wheel.

Although I have described this embodiment of my invention specifically, I do not intend to limit my patent protection to these exact details of construction and arrangement, for the invention is susceptible to numerous changes within the scope of the inventive ideas as implied and claimed.

What I claim as my invention is:

1. In a device for securing two correlated members in spaced and fixed relation to one another, each of the said members having a bolt-hole and having an annular V-shaped groove around its bolt-hole, the combination of a centrally apertured and internally threaded spacing and securing unit including annular V-shaped ridges around its threaded aperture, said ridges normally fitting in the respective grooves of said two members, a threaded bolt extending through said bolt-holes and spaced from the walls thereof and in threaded engagement with the said threaded aperture of said unit, and means on the ends of the bolt to combine therewith for clamping said correlated members against said spacing and securing unit.

2. The combination of a wheel-hub having an apertured flange, threaded bolts secured in the apertures of said flange, two wheel-discs each having eccentric bolt-holes through which said bolts extend, said wheel-discs each having V-shaped annular grooves around its respective bolt-holes, centrally apertured and internally threaded spacing and securing units each having V-shaped annular ridges normally fitting in the respective annular grooves of said wheel-discs while the internal threads thereof are engaged with the threads of the respective bolts and combined with said bolts for clamping one of said wheel-discs against said flange, and means combining with said bolts for clamping the other one of said wheel-discs against said spacing and securing units.

3. The combination of a wheel-hub having an apertured flange, threaded bolts each provided with a non-circular part fitted in the apertures of said flange and provided with means to secure it to the flange, two wheel-discs each having eccentric bolt-holes through which said bolts extend without essentially touching said wheel-discs, said wheel discs each having V-shaped annular grooves around its respective bolt-holes, centrally apertured and internally threaded spacing and securing units each having V-shaped annular ridges normally fitting in the respective annular grooves of said wheel-discs while the internal threads thereof are engaged with the threads of the respective bolts and combined with said bolts for clamping one of said wheel-discs against said flange, and means combined with said bolts for clamping the other one of said wheel-discs against said spacing and securing units.

4. The combination of a wheel-hub having an apertured flange, threaded bolts provided with means to secure them against movement in the apertures of said flange, two centrally apertured wheel-discs each having eccentric bolt-holes through which said bolts extend while the wheel-hub extends through the central aperture of the wheel-discs, said wheel discs each having V-shaped annular grooves around its respective bolt-holes, centrally apertured spacing and securing units each having V-shaped annular ridges normally fitting in the respective annular grooves of said wheel-discs while said spacing and securing units are fitted tightly around the respective bolts and combined therewith for clamping one of said wheel-discs against said flange, and means combined with said bolts for clamping the other one of said wheel-discs against said spacing and securing units.

In testimony whereof I affix my signature.

ALPHONSE L. LUSSIER.